Patented Mar. 27, 1934

1,952,243

UNITED STATES PATENT OFFICE 1,952,243

EASILY WORKABLE MASSES FROM PHENOLFORMALDEHYDE CONDENSATION PRODUCTS

Friedrich Frick, Uerdingen-on-the-Rhine, Germany, assignor to I. G. Farbenindustrie, Aktiengesellschaft, Frankfort - on - the - Main, Germany, a corporation of Germany No Drawing. Application January 3, 1929, Serial No. 330,151. In Germany January 7, 1928

10 Claims. (Cl. 260—4)

The invention relates to the manufacture of easily workable artificial masses from phenolformaldehyde condensation products.

My invention consists in incorporating with the phenolformaldehyde condensation products during the condensation process and while still in the liquid soluble phase polyalkylene glycol aryl ethers of the general formula $HO(C_nH_{2n}O)_xR$ (wherein R is an aromatic radicle, $n=2$ or more), or lower fatty acid esters thereof, or a mixture of aforesaid ethers, or a mixture of aforesaid esters, or a mixture of both, and then completing the condensation by heating until the desired state is reached. In accordance with the invention, the ultimate products thus obtained possess the same hardness and clarity as the insoluble phenolformaldehyde condensation products resulting from the customary processes without additive materials, but are distinguished therefrom by greater toughness and consequently can readily be worked with tools even in the final state, while the condensation products obtained in accordance with the customary methods are extraordinarily brittle and readily splinted in working.

The polyalkylene glycol derivatives preferably used are those mixtures of several compounds which are obtained by reacting with several moles of an olefine oxide upon one mole of an aromatic hydroxy compound and, if desired, esterifying the free hydroxy group by a lower fatty acid, such as formic acid, acetic acid, propionic acid or the like, for example, polyethylene glycol phenyl ether, polyethylene glycol cresyl ether, polypropylene glycol phenyl ether, polyethylene glycol phenyl ether acetate, polyalkylene glycol cresyl ether formate, polyethylene glycol cresyl ether acetate. The percentage amount of the additions may vary within wide limits and can be adapted from case to case to the properties of the artificial masses, it is desired to attain. It is advantageous to work with a quantity amounting to about 30 percent of the condensation product.

Besides the quantity of the material to be added the time and temperature of the reaction also have a great influence on the properties of the final products. In general the temperatures are the same as used in the production of phenol formaldehyde resins. Temperatures up to about 150° C. are permissible but not always necessary; in most cases, temperatures of 115°–120° C. will suffice. I have found further that most favourable results are obtained by carrying out the condensation after having added the polyalkylene glycol derivative, under superatmospheric pressure.

The products obtainable in accordance with the present process constitute technically valuable starting materials and are capable of finding application, say for example, as insulating lacquers.

The invention is illustrated by the following examples. The parts are by weight.

Example 1

10 parts of a liquid soluble or liquid plastic phenol formaldehyde condensation product soluble in ethyl alcohol and aqueous alkalies (obtained by heating 96 parts of phenol, 100 parts of a 35 percent formaldehyde solution and 1 part of aqueous ammonia (specific weight 0,926) for 3 to 6 hours to 100° C. and evaporating the water) are heated with 3 parts of polyethylene glycol cresyl ether (boiling from 180 to 260° C. at 20 mm. pressure and being produced by reacting with three moles of ethylene oxide upon one mole of technical cresol containing the ortho-, meta- and para-isomers) for about 25 hours from 95 to 135° C., the temperature being slowly raised from 95 to 135° during the first 15 hours. The resulting final product is hard and clear and can easily be worked with tools.

Example 2

10 parts of a liquid soluble phenolformaldehyde condensation product obtained as shown in Example 1 are heated with one part of polyethyleneglycol-cresylether acetate (boiling from 180 to 250° C. at 20 mm. pressure and being produced by esterifying the polyethylene glycol cresyl ether of Example 1 with acetic acid) for about 25 hours at 95–115° C. the temperature being slowly raised from 95 to 115° C. during the first 10 hours. The final product is then clear and hard and can easily be worked with knives.

Example 3

10 parts of a liquid soluble phenolformaldehyde condensation product (obtain as shown in Example 1) and 5 parts of polyethylene glycol cresyl ether formate (boiling from 175 to 200° at 20 mm. pressure and being produced by esterifying the polyethylene glycol cresyl ether of Example 1 with formic acid) are heated for 20 hours at temperatures of 95–150° C. the temperature being slowly raised from 95 to 150° during the first 10 hours. The final product can easily be worked.

I claim:

1. A condensation product of formaldehyde with a phenol and material selected from the group consisting of a polyalkylene glycol monoaryl ether of the general formula $HO(C_nH_{2n}O)_xR$ (wherein R is an aromatic radicle, $n=2$ or more and $x=2$ or more), an ester thereof with a lower fatty acid, a mixture of aforesaid ethers, a mixture of aforesaid esters and a mixture of both.

2. A condensation product of formaldehyde with phenol and a polyalkylene glycol monoaryl ether.

3. A condensation product of formaldehyde with phenol and a polyalkylene glycol monoaryl ether.

4. A condensation product of formaldehyde with phenol and a polyalkylene glycol monoaryl ether.

5. The process which comprises incorporating material selected from the group consisting of a polyalkylene glycol monoaryl ether of the general formula $HO(C_nH_{2n}O)_xR$ (wherein R is an aromatic radicle, $n=2$ or more and $x=2$ or more), an ester thereof with a lower fatty acid, a mixture of aforesaid ethers, a mixture of aforesaid esters and a mixture of both with a phenolformaldehyde condensation product during the condensation process and while still in the liquid soluble phase and then completing the condensation by heating to a temperature below the decomposition temperature of the phenolformaldehyde condensation product.

6. The process which comprises incorporating material selected from the group consisting of a polyalkylene glycol monoaryl ether of the general formula $HO(C_nH_{2n}O)_xR$ (wherein R is an aromatic radicle, $n=2$ or more and $x=2$ or more), an ester thereof with a lower fatty acid, a mixture of aforesaid ethers, a mixture of aforesaid esters and a mixture of both with a phenolformaldehyde condensation product during the condensation process and while still in the liquid soluble phase and then completing the condensation by heating to a temperature not exceeding 150° C.

7. The process which comprises incorporating material selected from the group consisting of a polyalkylene glycol monoaryl ether of the general formula $HO(C_nH_{2n}O)_xR$ (wherein R is an aromatic radicle, $n=2$ or more and $x=2$ or more), an ester thereof with a lower fatty acid, a mixture of aforesaid ethers, a mixture of aforesaid esters and a mixture of both with a phenolformaldehyde condensation product during the condensation process and while still in the liquid soluble phase and then completing the condensation by heating to a temperature of from about 95° to about 150° C.

8. The process which comprises incorporating a polyalkylene glycol monoaryl ether with a phenolformaldehyde condensation product during the condensation process and while still in the liquid soluble phase and then completing the condensation by heating to a temperature of from about 95° to about 150° C.

9. The process which comprises incorporating a polyethylene glycol monoarylether with a phenolformaldehyde condensation product during the condensation process and while still in the liquid soluble phase and completing the condensation by heating to a temperature of from about 95° to about 150° C.

10. The process which comprises incorporating polyethylene glycol monocresyl ether with a phenolformaldehye condensation product during the condensation process and while still in the liquid soluble phase and completing the condensation by gradually heating to a temperature of from about 95° to 135° C.

FRIEDRICH FRICK.